(12) United States Patent
Sato

(10) Patent No.: US 6,929,025 B2
(45) Date of Patent: Aug. 16, 2005

(54) TWO-WAY VALVE

(75) Inventor: Hiroji Sato, Tokyo (JP)

(73) Assignee: Nifco Inc., Yokohama (JP)

( * ) Notice: Subject to any disclaimer, the term of this patent is extended or adjusted under 35 U.S.C. 154(b) by 208 days.

(21) Appl. No.: 10/349,910

(22) Filed: Jan. 24, 2003

(65) Prior Publication Data

US 2003/0150492 A1 Aug. 14, 2003

(30) Foreign Application Priority Data

Feb. 14, 2002 (JP) ............................. 2002-036892

(51) Int. Cl.⁷ ............................................. F16K 17/196
(52) U.S. Cl. ................... 137/493.6; 137/493.9
(58) Field of Search .................. 137/493, 493.6 I, 137/493.9, 493.3

(56) References Cited

U.S. PATENT DOCUMENTS

| | | | | |
|---|---|---|---|---|
| 115,982 A | * | 6/1871 | Porteous .................. | 137/493.6 |
| 4,000,828 A | * | 1/1977 | Crute et al. ............... | 137/493.6 |
| 4,498,493 A | * | 2/1985 | Harris ...................... | 137/493.6 |
| 5,582,198 A | * | 12/1996 | Nagino et al. ........... | 137/493.6 |

* cited by examiner

Primary Examiner—Stephen M. Hepperle
(74) Attorney, Agent, or Firm—Manabu Kanesaka

(57) ABSTRACT

A two-way valve includes a valve case with the first valve seat formed at one of two openings, the first valve member movable in the valve case for abutting against the first valve seat, and the first urging device for urging the first valve member toward the first valve seat. The first valve member includes a communication path therein and the second valve seat formed at one end portion thereof. The second valve member for abutting against the second valve seat is disposed in the communication path to block the communication path, and the second urging device is provided for urging the second valve member toward the second valve seat.

10 Claims, 7 Drawing Sheets fuel tank side canister side

TWO-WAY VALVE

BACKGROUND OF THE INVENTION AND RELATED ART STATEMENT

The present invention relates to a two-way valve having two openings and being configured to open a valve regardless of positive or negative pressure when a pressure difference between the two openings reaches a predetermined value. For example, the two-way valve is installed between a fuel tank and a canister in an automobile, etc., and when a pressure inside of the fuel tank becomes higher or lower than a specific pressure range, the two-way valve opens the valve to maintain a predetermined pressure inside the fuel tank, which is used ideally as a check valve.

The two-way valve, usually called the check valve, is installed between a fuel tank and a canister in an automobile. When a pressure inside the tank becomes higher than a predetermined value, the check valve opens and releases the pressure inside the tank to the canister. Also, when the pressure inside the tank becomes lower than a predetermined value, the check valve opens to release the reduced pressure state inside the tank.

As an example of the conventional check valve, a two-way valve has been disclosed in Japanese Patent Publication (Tokkai) No. 09-60744.

As shown in FIGS. 4 and 5, the two-way valve includes a valve case 'c' having a case main body 'a' integrated with a two-way pipe a1 connected to the fuel tank and a lid 'b' integrated with a pipe b1 connected to the canister; a cylindrical valve main member 'd' with a bottom; and a valve seat cap 'e' fixed to the valve main member. Also, the two-way valve includes the first valve member 'f' disposed inside the valve case 'c'; a coil spring 'g' for urging the first valve member 'f'; the second valve member 'h' housed inside the first valve member 'f'; and a coil spring 'i' for urging the second valve member 'h'.

At the first opening a2 provided in the case main body 'a' of the valve case 'c', a ring-shaped first valve seat a3 is formed to project into the case. Also, around the second opening b2 provided in the lid 'b', a ring protrusion rib b3 is projected to support one end of the coil spring 'g'.

A dome valve head d1 is formed to project outward from a top of the valve main member 'd' constituting the first valve member 'f'. A communication port d2 is pierced in this valve head d1. Also, in the valve seat cap 'e' constituting the first valve member 'f', a communication port e2 is formed on a wall portion blocking an opening edge of the valve main member 'd'. A rim of an inside perimeter of the communication port e2 becomes the second valve seat e3. The first valve member 'f' is urged to the first opening a2 side by the coil spring 'g' arranged in a state that one end thereof is supported by the ring protrusion rib 'b' and the other end contacts the valve seat cap 'e'.

Additionally, the second valve member 'h' is formed in a cylindrical shape with a distal end portion blocked in almost a dome-shape, and the dome-shaped edge portion is the valve head h1. The second valve member 'h' is disposed to be movable inside the first valve member 'f' and is urged toward the second valve seat e3 by the coil spring 'i' disposed inside the first valve member 'f'.

As shown in FIG. 5, the two-way valve is usually in a state that the valve head hi of the second valve member 'h' contacts the second valve seat e3, and the inside the hollow portion of the first valve member 'f' is blocked. Also, the valve head d1 of the first valve member 'f' contacts the first valve seat a3 and the first opening a2 is closed.

In this state, when the pressure inside the fuel tank increases, and a pressure of the first opening a2 side becomes higher than that of the second opening b2 side by a predetermined value, the first valve member 'f' moves against an urging force of the coil spring 'g' by pressure from the first opening a2 side. Then, the valve head d1 of the first valve member 'f' separates from the first valve seat a3 to open the first opening a2, as shown in FIG. 6. Thus, the pressure at the fuel tank side passes from the first opening a2 through a space between an outside perimeter surface of the first valve member 'f' and an inside perimeter surface of the valve case 'c', and further through the second opening b2 to be released to the canister side.

On the other hand, when the pressure inside the fuel tank is reduced and the second opening b2 side becomes higher than that of the first opening a2 side by a predetermined value, as shown in FIG. 7, the second valve member 'h' moves against an urging force of the coil spring 'i' by pressure from the second opening b2 side. Then, the valve head h1 of the second valve member 'f' separates from the second valve seat e3 and the communication port e2 opens. Thus, the pressure at the canister side passes from the second opening b2 to the communication port e2, through a space between an outside perimeter surface of the second valve member 'h' and an inside perimeter surface of the first valve member 'f'. Then, the pressure sequentially passes through the communication port d2 and the first opening a2 to the fuel tank, thereby releasing the reduced pressure state inside the fuel tank.

Thus, according to the two-way valve, when the inside pressure of the fuel tank exceeds or is reduced beyond a specific range, the valve opens to release the pressurized or the reduced pressure state inside the tank to the canister side. Thus, the inside of the fuel tank can be maintained within a predetermined pressure range all the time.

However, the two-way valve has a problem of causing a vibration or large noise when the positive pressure of the fuel tank side is released to the canister side.

Specifically, when the pressure inside the fuel tank increases and the pressure at the first opening a2 side becomes high, as shown in FIG. 6, the first valve member 'f' moves from the first opening a2 side by the pressure, and the valve head d1 of the first valve member 'f' separates from the first valve seat a3. When the first opening a2 opens and the pressure at the fuel tank side is released toward the canister side, an airflow flowing inside the valve from the first opening a2 flows inside the first valve member 'f' through the communication port d2 in the conventional valve, as shown with arrows in FIG. 6. Consequently, a heavy turbulent flow occurs inside the first valve member 'f' because of the communication port d2 in the valve head d1 of the first valve member 'f'. The turbulent flow also occurs in an airflow flowing outside of the valve head d1, and causes vibrations or unpleasant abnormal noises.

The pressure inside the fuel tank often rises rapidly when gasoline is jolted when it is refilled or under high temperature. In this case, the airflow passes inside the valve at an extremely high-speed, thus the above-mentioned vibrations or abnormal noises easily exceed an acceptable limit.

The present invention is proposed in order to solve the problems, and an object of the present invention is to provide a two-way valve for reliably regulating the pressure when the valve is opened to release and regulate the pressure while eliminating vibrations or abnormal noises by the turbulent airflow of ventilation as little as possible without causing vibrations or unpleasant abnormal noises through a smooth ventilation of the airflow.

Further objectives and advantages of the invention will be apparent from the following description of the invention.

SUMMARY OF THE INVENTION

In order to achieve the above-mentioned objects, the invention provides a two-way valve having two openings arranged to face each other. The two-way valve includes a valve case with the first valve seat formed at one of the two openings; the first valve member disposed to be movable in the valve case for abutting against the first valve seat provided at the one of the two openings to block the opening; the first urging device for urging the first valve member toward the one of the two openings; a communication path provided in the first valve member and having the second valve seat formed at one end portion thereof; the second valve member for abutting against the second valve seat disposed in the communication path to block the communication path; and the second urging device for urging the second valve member toward the second valve seat of the communication path.

When a pressure at one of the openings becomes higher than that at the other opening by a predetermined value, the first valve member moves against an urging force of the first urging device to open the one of the openings and release the pressure to the other opening. Also, when a pressure at the other opening becomes higher than that at the one of the openings by a predetermined value, the second valve member moves against an urging force of the second urging device to open the communication path and release the pressure to the one of the openings through the communication path. In this two-way valve described above, a valve head of the second valve member abuts against the second valve seat provided in the communication path from outside of the first valve member.

In the two-way valve according to the present invention, it is structured that the valve head of the second valve member abuts against the second valve seat provided in the communication path from outside of the first valve member to open and close the communication path provided in the first valve member. Therefore, a depressed portion is not formed in an airflow path. When the pressure is released in either direction, the pressure can be released smoothly without causing heavy turbulent flow, thereby eliminating vibration or unpleasant abnormal noises, and the pressure can be regulated reliably.

In this case, although it is not limited to, it is preferred that the valve head of the second valve member be formed in substantially a circular cone shape. The airflow in the valve case can be guided smoothly to an inside periphery surface of the valve case along an outside periphery surface of the valve head, thereby securely preventing the turbulent flow, and vibrations or abnormal noises.

Thus, the two-way valve of the present invention can prevent vibrations or abnormal noises caused by the turbulent airflow inside the valve as little as possible, and can reliably regulate the pressure by smooth airflow without vibrations or unpleasant abnormal noises.

DETAILED DESCRIPTION OF PREFERRED EMBODIMENTS

Figure 1:
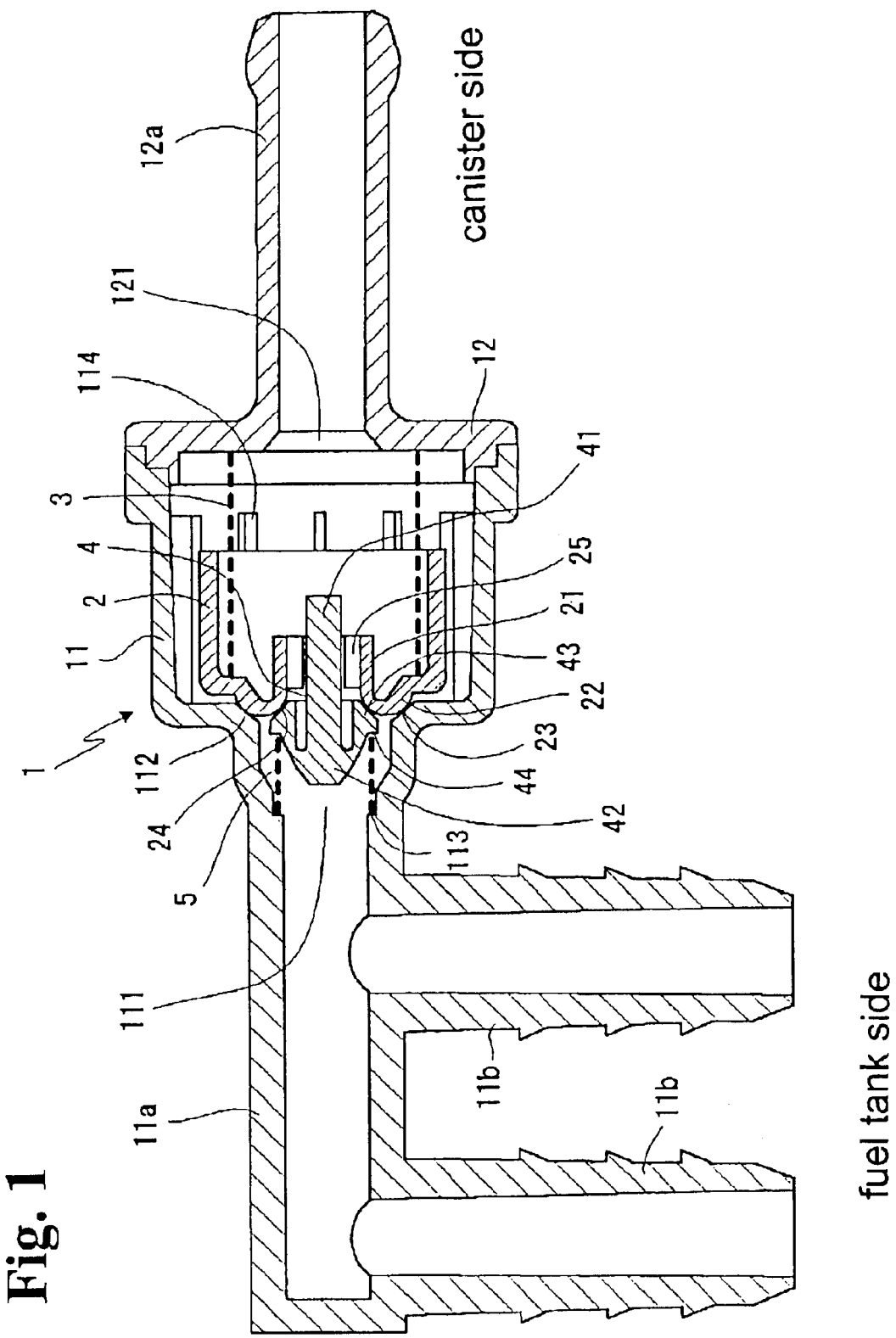
FIG. 1 is a sectional view showing an embodiment of a two-way valve according to the present invention.
Figure 2:
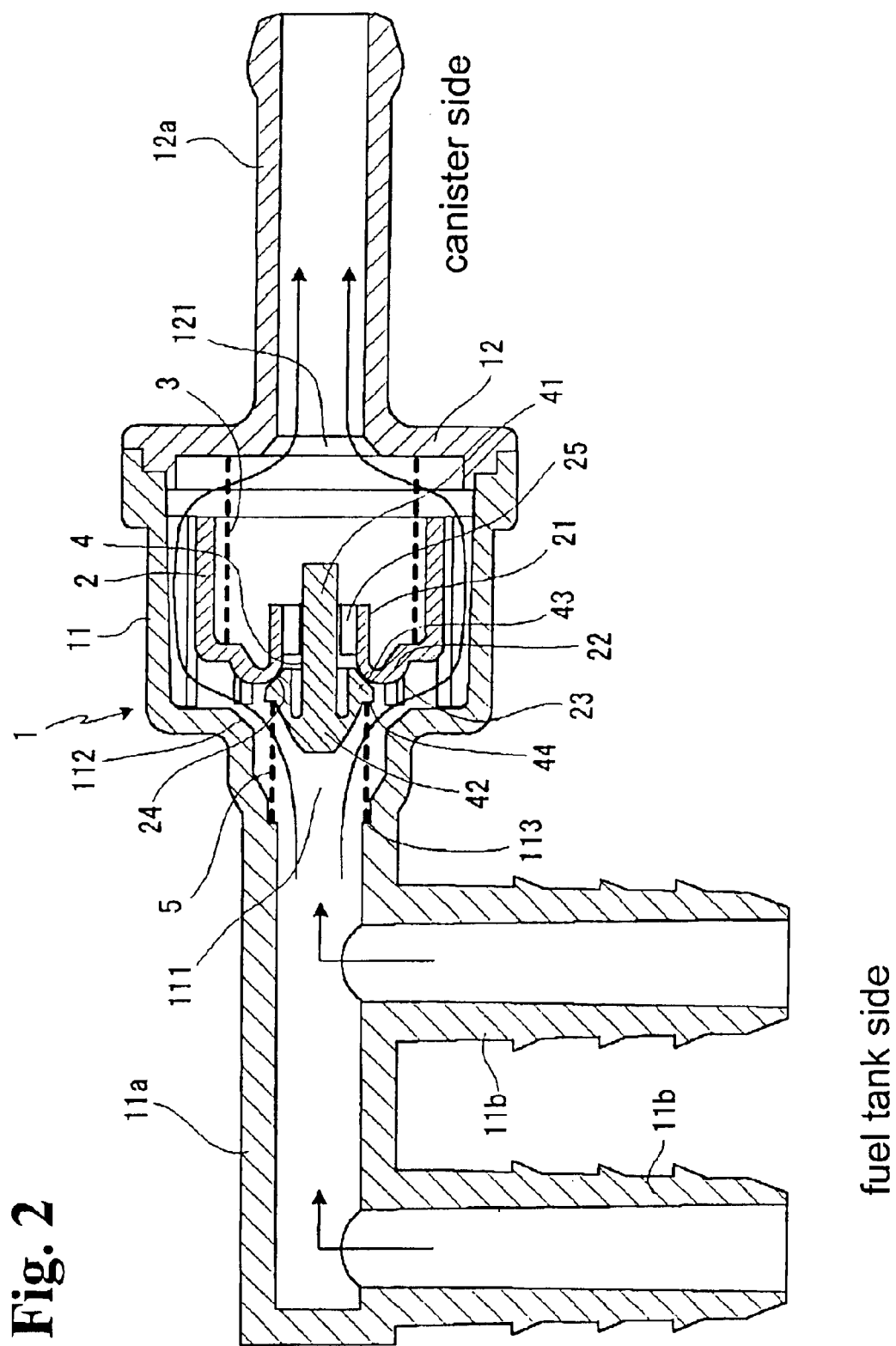
FIG. 2 is a sectional view showing a state where one valve of the two-way valve is opened when one side of openings is pressurized.
Figure 3:
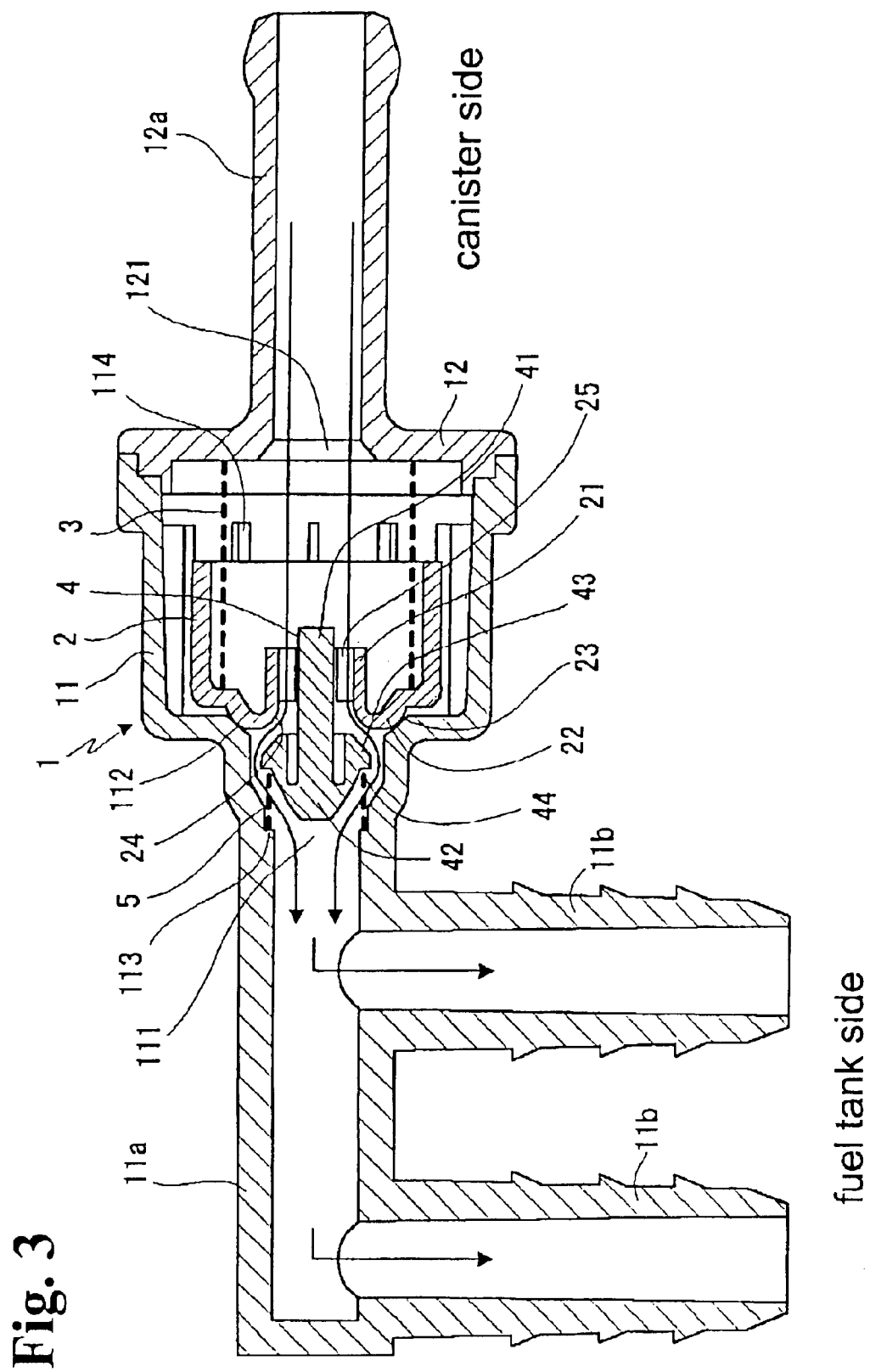
FIG. 3 is a sectional view showing a state where the other valve of the two-way valve is opened when the other side of the openings is pressurized.
Figure 4:
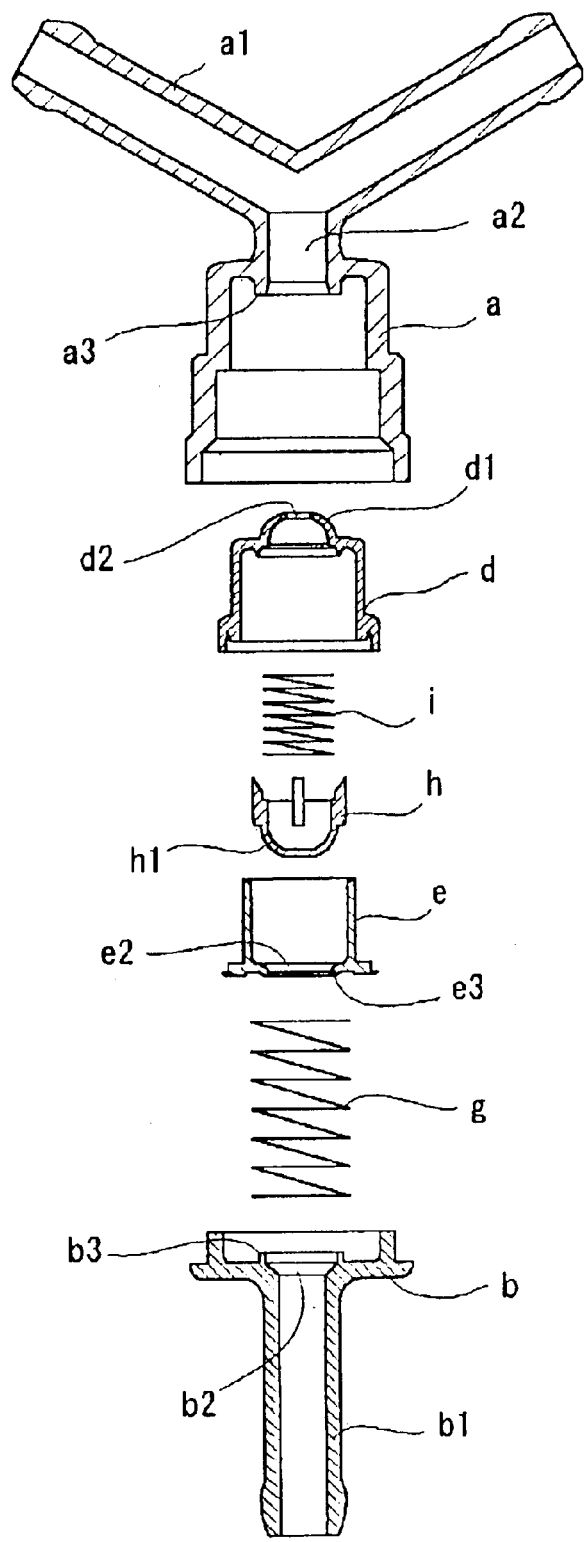
FIG. 4 is an exploded sectional view showing a conventional two-way valve.
Figure 5:
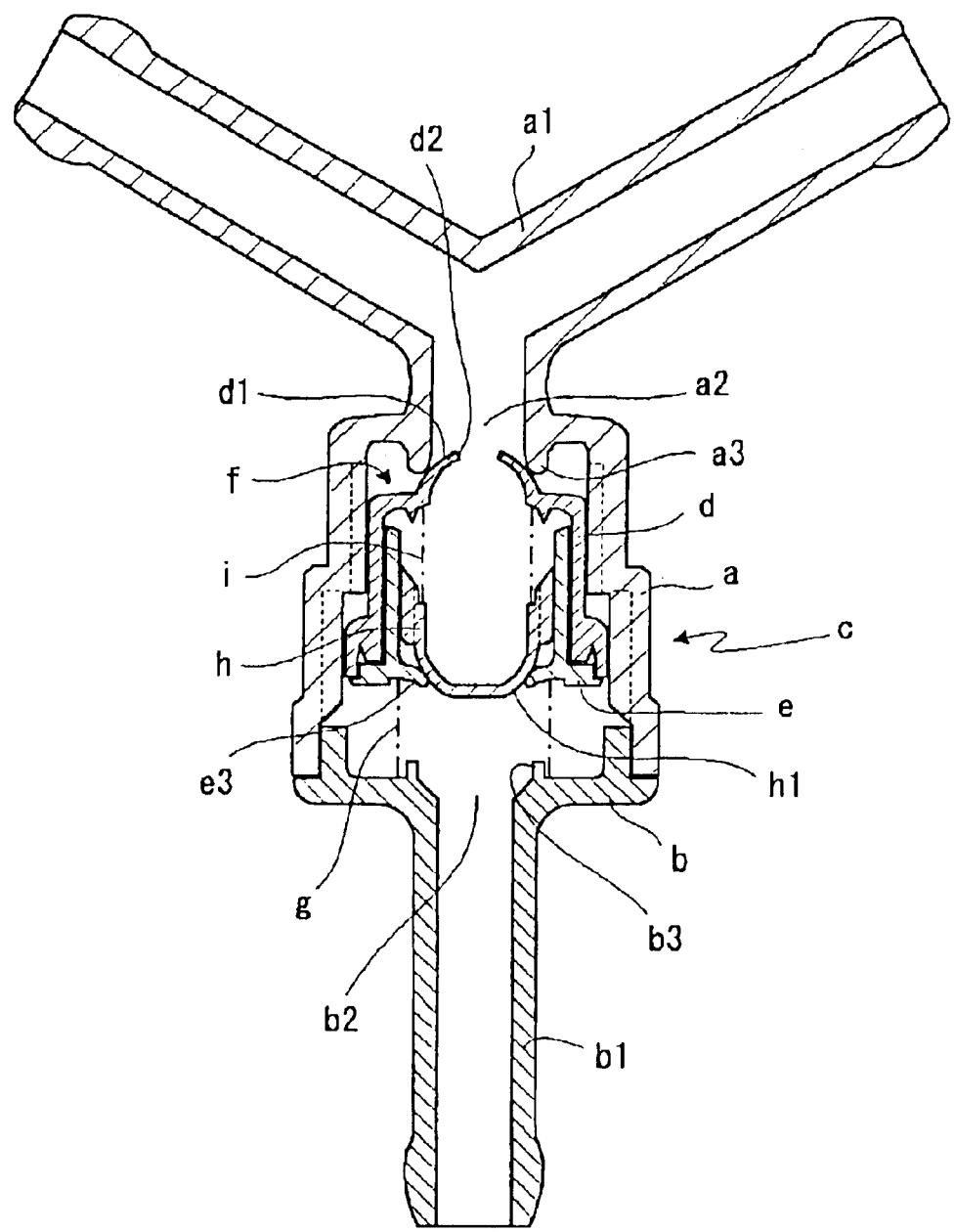
FIG. 5 is a sectional view showing a state where the conventional two-way valve is closed.
Figure 6:
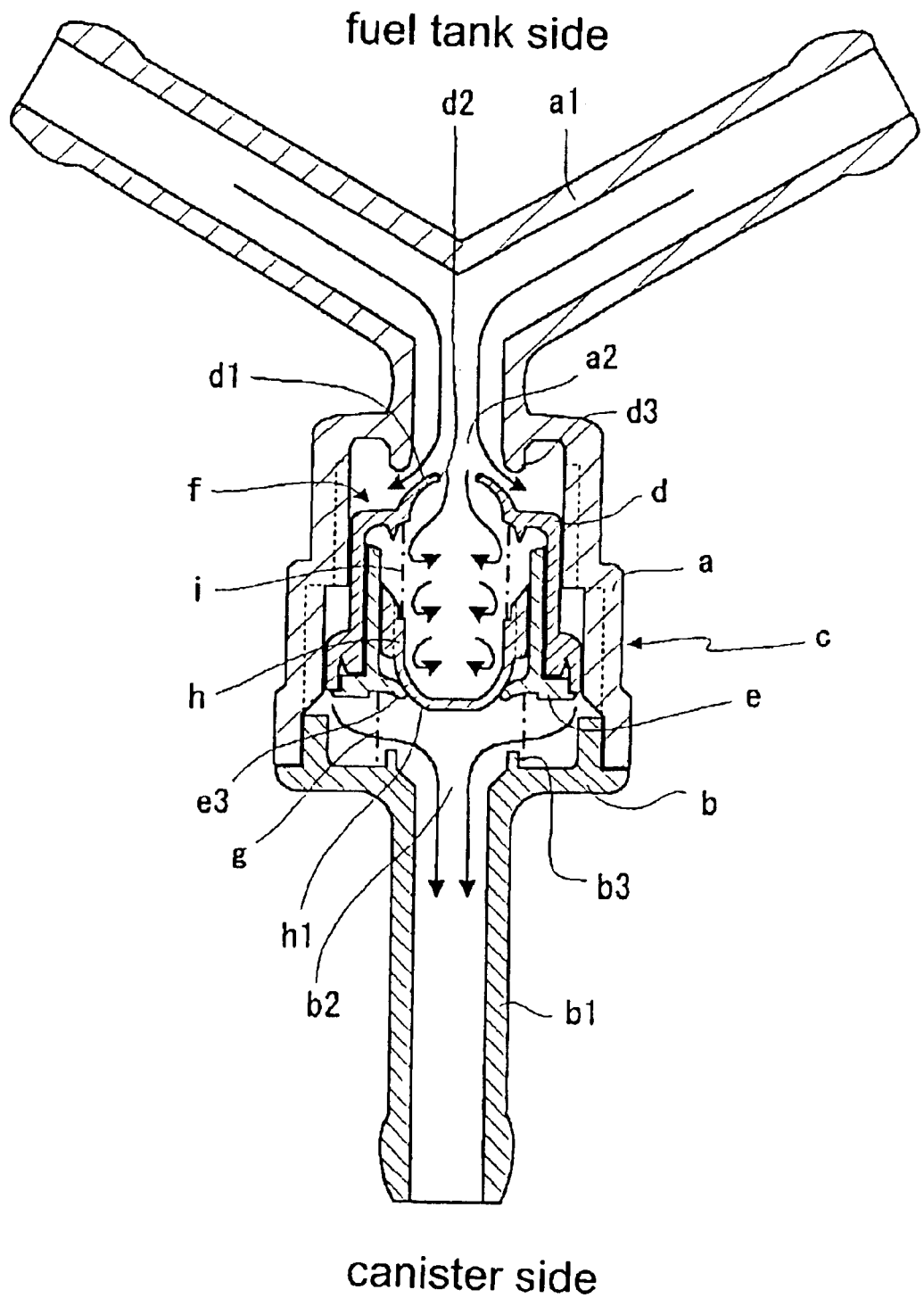
FIG. 6 is a sectional view showing a state where one valve of the conventional two-way valve is opened when one side of the openings is pressurized.
Figure 7:
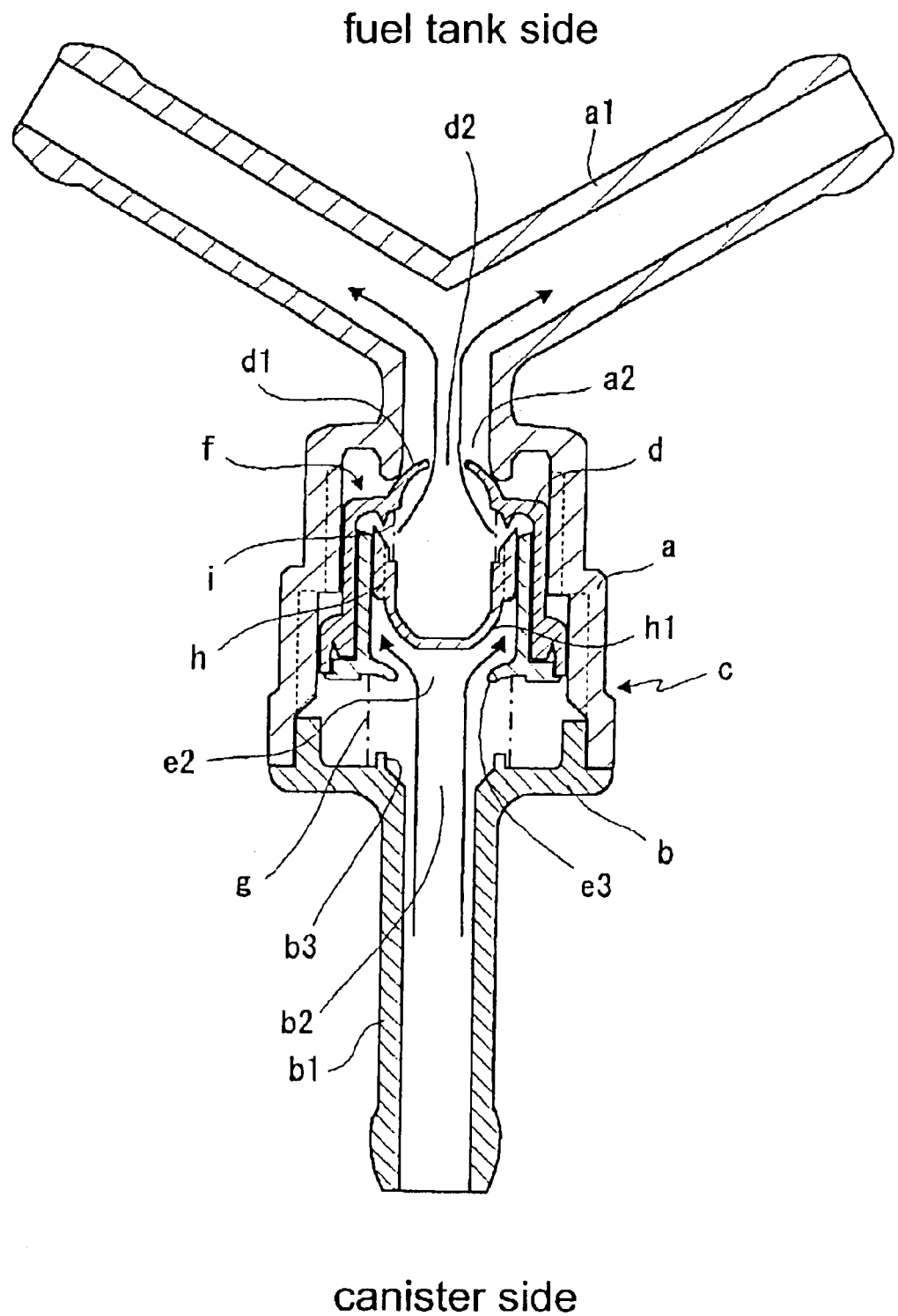
FIG. 7 is a sectional view showing a state where the other valve of the conventional two-way valve is opened when the other side of the openings is pressurized.

Hereunder, embodiments of the present invention will be explained with reference to the accompanying drawings. FIGS. 1–3 show the two-way valve according to the embodiment of the invention. The two-way valve includes a case main body 11 integrated with a pipe 11a connected to a fuel tank of an automobile; a lid 12 integrated with a pipe 12a connected to a canister; a valve case 1 formed of the case main body 11 and the lid 12; a cylindrical first valve member 2; a coil spring 3 for urging the first valve member 2 (the first urging device); the second valve member 4 for opening and closing a communication path 21 provided inside the first valve member 2; and a coil spring 5 for urging the second valve member 4 (the second urging device).

In the case main body 11 composing the valve case 1, the first opening 111 with a diameter slightly larger than that of the pipe 11a is provided at a connecting portion of the pipe 11a. In an end portion of the first opening 111 at a side of the pipe 11a, a step portion 113 is formed for supporting an end portion of the coil spring 5. Also, an inside perimeter surface of a side end portion of the first opening 111 at a side of the case main body 11 is a first valve seat 112 formed in a tapered shape. In addition, in an inside perimeter surface of the case main body 11, a plurality of projecting ribs 114 projects evenly along an axial direction. Also, two branching pipes 11b connected to a fuel blocking valve disposed in the fuel tank are connected to the pipe 11a.

In the lid 12 composing the valve case 1, the second opening 121 is provided at a connecting portion of the pipe 12a. The lid 12 is fixed to an open end of the case main body 11 with an ultrasonic welding, and the valve case 1 is composed of the lid 12 and the case main body 11.

The first valve member 2 has a cylindrical shape with a bottom. A communication port is provided at the center of the bottom wall, and a tubular communication path 21 communicating to the communication port is formed along the axial direction toward the inside of the first valve member 2. Additionally, a ring-shaped protrusion 22 with an arc shape section is formed around the communication port of the outer surface of the bottom wall. An outer periphery surface of the ring-shaped protrusion 22 is a vale head portion 23, and an inner perimeter surface thereof is the second valve seat 24. In an inner surface of the communication path 21, four projecting ribs 25 are evenly projected along the axial direction, separating in 90 degrees with each other.

The first valve member 2 is disposed inside the valve case 1 with the ring-shaped protrusion 22 facing toward the first opening 111 side. Also, the first valve member 2 is urged toward the first opening 111 side by the coil spring 3 disposed between the inner face of the bottom wall of the first valve member 2 and the surrounding area of the second opening 121 of the lid 12 composing the valve case 1.

The second valve member 4 is integrated with a substantially cone-shaped valve head portion 42 at one end portion of a round-bar-shaped shaft 41. A peripheral edge of a bottom surface of the valve head portion 4 is chamfered in an inverse tapered shape, and becomes a valve seat contact portion 43 abutting against the second valve seat 24.

The second valve member 4 has a shaft portion 41 inserted into the communication path 21 of the first valve member 2, and is arranged to slide freely in a state that the valve head portion 42 is located outside the first valve member 2. The second valve member 4 is also urged toward the inside of the first valve member 2 with the coil spring 5. One end of the coil spring 5 is supported by a step portion 44 provided in the valve seat contact portion 43 of the second valve member 4, and the other end thereof is supported by a step portion 113 provided at an inner perimeter of the opening 111 of the valve case 1.

In this embodiment, the parts forming the valve case 1, i.e. the case main body 11 and the lid 12, the first valve member 2, and the second valve member 4 are formed of polyacetal having low fuel permeability. Although the material is not limited to polyacetal and can be formed of a wide variety of materials, it is preferred to use a material with low fuel permeability.

Next, an operation of the two-way valve will be explained. The two-way valve 111 is usually closed, as shown in FIG. 1. That is, the communication path 21 of the first valve member 2 is closed in a state that the valve seat contact portion 43 provided in the valve head portion 42 of the second valve member 4 contacts the second valve seat 24 of the first valve member 2, and the first opening 111 is closed in a state that the valve head portion 23 of the first valve member 2 contacts the first valve seat 112 of the valve case 1.

In this state, when the pressure inside the fuel tank rises and the first opening 111 side has a pressure higher than that of the second opening 121 side by a predetermined pressure, as shown in FIG. 2, the first valve member 2 moves against an urging force of the coil spring 3 by the pressure from the first opening 111 side and the valve head portion 23 of the first valve member 2 is separated from the first valve seat 112 to open the first opening 111. At this time, the second valve member 4 moves with the first valve member 2 in a state that the second valve member 4 blocks the communication path 21 of the first valve member 2 by an urging force of the coil spring 5. Air by the pressure at the fuel tank side flows inside the valve main member 11 from the first opening 111, and is guided to the inside perimeter surface side of the valve main member 11 along the outer periphery surface of the valve head portion 42 of the second valve member 4. Then, the air passes a space between the outer periphery surface of the first valve member 2 and the inner perimeter surface of the valve main member 11, and flows to the canister side through the second opening 121, thereby releasing the pressure inside the fuel tank.

On the other hand, when the pressure inside the fuel tank is reduced, and the second opening 121 side has a pressure higher than that of the first opening 111 side by a predetermined pressure, as shown in FIG. 3, the second valve member 4 moves against an urging force of the coil spring 5 by the pressure from the second opening 121 side, and the valve seat contact portion 43 provided in the valve head portion 42 of the second valve member 4 is separated from the second valve seat 24 provided in the first valve member 2. Thus, the communication path 21 of the first valve member 2 opens, air by the pressure from the canister side flows inside the first valve member 2 from the second opening 121. Then, the air passes inside the communication path 21 through a space between the outer periphery surface of the valve head portion 42 of the second valve member 4 and the inner perimeter surface of the case main body 11, and flows in the fuel tank through the first opening 111, thereby releasing the reduced pressure state inside the fuel tank.

Thus, according to the two-way valve, similar to the conventional two-way valve as shown in FIGS. 4–7, when the pressure inside the fuel tank is increased or decreased by more than the predetermined pressure range, the valve can be opened to release the positive pressure or negative pressure inside the tank to the canister side, thereby maintaining the inside of the fuel tank at a predetermined pressure range all the time.

In this case, the two-way valve of the embodiment is composed so that the valve head portion 42 of the second valve member 4 for opening the communication path 21 contacts the second valve seat 24 from outside of the first valve member 2. Therefore, as shown in FIGS. 2 and 3, when the pressure is released in either regular or inverse direction, the airflow can be ventilated smoothly without creating a depressed portion blocked in the flow pass of the airflow, thereby eliminating a large turbulent flow. The pressure can be regulated reliably without causing vibrations or unpleasant abnormal noises.

Especially, when the positive pressure of the fuel tank side is released to the canister side, as described above, air or airflow is likely to become a strong one. However, in the two-way valve of this embodiment, as shown in FIG. 2, the valve head portion 42 of the second valve member 4 formed in the circular cone shape guides the airflow to the inner perimeter surface side of the valve main member 11 smoothly, and can securely prevent the turbulent flow, vibrations, or abnormal noises.

Thus, the two-way valve of the embodiment can prevent vibrations or abnormal noises due to the turbulence of the airflow passing inside the valve as little as possible, and can reliably regulate the pressure without causing vibrations or unpleasant abnormal noises through the smooth ventilation airflow.

Furthermore, in the two-way valve of the embodiment, the second valve member 4 is attached to the communication path 21 from outside of the first valve member 2, and the coil spring 5 for urging the second valve member 4 is disposed between the step portion 44 provided in the second valve member 4 and the step portion 113 provided in the valve case 1. Thus, a spring bearing seat is not required inside the first valve member 2 like a case that the coil spring is disposed inside the first valve member 2 and urges the second valve member 4. In this case, after the second valve member 'h' and the coil spring 'i' are disposed in the valve main member 'd' composing the first valve member 'f' like the conventional valve as shown in FIGS. 4–7, it is not required to fix the valve seat cap 'e' and block the valve main member 'd'. In the two-way valve of this embodiment, a part corresponding to the valve seat cap 'e' in the conventional embodiment is eliminated.

Additionally, the two-way valve can be assembled in one process in which the first valve member 2, the second valve member 4, and two coil springs 3 and 5 are arranged inside the case main body 11 composing the valve case 1, followed by ultrasonic welding the lid 12 to the case main body 11 to close the same. Compared to the two stage assembly process, in which the second valve member 'h' and the coil spring 'i' are disposed inside the first valve member 'f' in the first process; and this first valve member 'f' and the coil spring 'g' are disposed inside the case main body 'c' in the second process, as in the conventional valve as shown in FIGS. 4–7, the assembly process of the two-way valve of the invention can be simplified.

Thus, the two-way valve of the embodiment can reduce the number of the parts as compared with the conventional valve, and simplify the assembling process, thereby reducing a manufacturing cost and providing the two-way valve at a lower cost than the conventional valve.

The two-way valve of the invention is not limited to the above-mentioned embodiment. The shape of the case main body 1, the first valve member 2, the second valve member 4, and the urging devices 3 and 5 can be modified. Also, various modifications can be done in other configurations as long as they do not deviate from the content of the current invention. Although the two-way valve of the invention is suitable for a check valve disposed between the fuel tank and the canister of an automobile, the invention is not limited to this application. It can be used for a valve for opening and closing various types of receptacles or other closed containers according to an internal pressure thereof, and for maintaining the internal pressure thereof within a predetermined range.

As explained above, the two-way valve of the present invention can prevent vibrations or abnormal noises due to the turbulence of the airflow passing inside the valve as little as possible and can regulate the pressure reliably without arising vibrations or unpleasant abnormal noises through the smooth airflow.

While the invention has been explained with reference to the specific embodiments of the invention, the explanation is illustrative and the invention is limited only by the appended claims.

What is claimed is:

1. A two-way valve, comprising:
a valve case having two openings and a first valve seat formed at one of the two openings;
a first valve member movably disposed in the valve case for closing the one of the two openings upon abutting against the first valve seat, said first valve member having a first head portion forming a protrusion, a communication path with two ends and a second valve seat formed at the first head portion in one of the two ends of the communication path;
a first urging device disposed in the valve case for urging the first valve member toward the first valve seat;
a second valve member disposed in the valve case and having a second head portion located outside the first valve member for closing the communication path upon abutting against the second valve seat from outside the first valve member, said second head portion having a circular cone shape to form an inclined surface from the second head portion to the first head portion when the second valve member is disposed on the second valve seat so that when the first valve moves away from the first valve seat against a force of the first urging device, a fluid is guided smoothly to an inner surface of the valve case along the second valve head and the first valve head; and
a second urging device disposed in the valve case for urging the second valve member toward the second valve seat at the communication path, said second urging device being disposed between the second valve member and an inner surface of the valve case.

2. A two-way valve, comprising:
a valve case having two openings and a first valve seat formed at one of the two openings, said valve case being formed of a case main body with a bottom and a lid for closing the case main body, said bottom of the case main body having the one of the two openings of the valve case and said lid having the other of the two openings of the valve case;
a first valve member movably disposed in the valve case for closing the one of the two openings upon abutting against the first valve seat, said first valve member having a first head portion forming a protrusion, a communication path with two ends and a second valve seat formed at the first head portion in one of the two ends of the communication path;
a first urging device disposed in the valve case for urging the first valve member toward the first valve seat;
a second valve member disposed in the valve case and having a second head portion located outside the first valve member for closing the communication path upon abutting against the second valve seat from outside the first valve member, said second head portion having a circular cone shape to form an inclined surface from the second head portion to the first head portion when the second valve member is disposed on the second valve seat so that when the first valve moves away from the first valve seat against a force of the first urging device, a fluid is guided smoothly to an inner surface of the valve case along the second valve head and the first valve head; and
a second urging device disposed in the valve case for urging the second valve member toward the second valve seat at the communication path.

3. A two-way valve according to claim 2, wherein said second valve member includes a shaft portion attached to the second head portion and slidably located in the communication path, said second head portion being arranged to abut against the second valve seat from an outside of the first valve member to close the communication path.

4. A two-way valve according to claim 3, wherein said shaft portion has an outer dimension smaller than an inner dimension of the communication path so that when the second valve moves away from the second valve seat against a force of the second urging device, fluid passes through a space between an outer surface of the shaft portion and an inner surface of the communication path.

5. A two-way valve according to claim 2, wherein said one of the two openings of the valve case is connected to a fuel tank in an automobile, and said other of the two openings of the valve case is connected to a canister in the automobile so that the two-way valve can regulate a difference in pressure between the fuel tank and the canister.

6. A two-way valve according to claim 2, wherein said first valve member has an outer dimension smaller than an inner dimension of the valve case so that when the first valve moves away from the first valve seat against a force of the first urging device, fluid passes through a space between an outer surface of the first valve member and an inner surface of the valve case.

7. A two-way valve according to claim 2, wherein said valve case further includes a pipe extending from the bottom around the one of the two openings of the valve case, said first valve seat being formed at the bottom around the one of the two openings.

8. A two-way valve according to claim 7, wherein said pipe includes a step portion at an inner periphery thereof, one end of the second urging device being disposed on the step portion.

9. A two-way valve, comprising:

a valve case having two openings and a first valve seat formed at one of the two openings;

a first valve member movably disposed in the valve case for closing the one of the two openings upon abutting against the first valve seat, said first valve member having a communication path with two ends therein and a second valve seat formed at one of the two ends of the communication path, and formed of an outer cylindrical portion, an inner cylindrical portion disposed in the outer cylindrical portion, and a protrusion integrally connected to one end of the outer cylindrical portion and one end of the inner cylindrical portion, said protrusion having the second valve seat and a valve seat abutting against the first valve seat;

a first urging device disposed in the valve case for urging the first valve member toward the first valve seat;

a second valve member disposed in the valve case and having a head portion located outside the first valve member for closing the communication path upon abutting against the second valve seat from outside the first valve member; and a second urging -device disposed in the valve case for urging the second valve member toward the second valve seat at the communication path.

10. A two-way valve according to claim 9, wherein said first urging device is disposed between the valve case and a space between the inner and outer cylindrical portions.

* * * * *